United States Patent
Fichuk et al.

(10) Patent No.: US 11,810,052 B2
(45) Date of Patent: Nov. 7, 2023

(54) METHOD AND SYSTEM FOR MESSAGE MAPPING TO HANDLE TEMPLATE CHANGES

(71) Applicant: Shopify Inc., Ottawa (CA)

(72) Inventors: Dexter Fichuk, Selwyn (CA); Vera Olsson, Märsta (SE); Anton Vlasenko, Nacka (SE)

(73) Assignee: Shopify Inc., Ottawa (CA)

( * ) Notice: Subject to any disclaimer, the term of this patent is extended or adjusted under 35 U.S.C. 154(b) by 85 days.

(21) Appl. No.: 17/390,162

(22) Filed: Jul. 30, 2021

(65) Prior Publication Data
US 2023/0030234 A1 Feb. 2, 2023

(51) Int. Cl.
*G06F 16/31* (2019.01)
*G06Q 10/0833* (2023.01)
*G06F 16/835* (2019.01)

(52) U.S. Cl.
CPC ......... *G06Q 10/0833* (2013.01); *G06F 16/31* (2019.01); *G06F 16/835* (2019.01)

(58) Field of Classification Search
CPC .... G06Q 10/0833; G06F 16/30; G06F 16/835
USPC ....................................................... 709/245
See application file for complete search history.

(56) References Cited

U.S. PATENT DOCUMENTS

| | | |
|---|---|---|
| 6,792,535 B1 | 9/2004 | Kwan |
| 9,002,832 B1 | 4/2015 | Patel |
| 9,563,689 B1 * | 2/2017 | Pueyo ................. G06F 21/6245 |
| 9,652,530 B1 * | 5/2017 | Bendersky ............. G06F 16/83 |
| 9,785,705 B1 | 10/2017 | Cartright |
| 2005/0165648 A1 | 7/2005 | Razumov |
| 2014/0157440 A1 | 6/2014 | Georgiev |
| 2016/0142859 A1 | 5/2016 | Molinet |
| 2018/0024986 A1 * | 1/2018 | Singh ...................... H04L 67/10 704/9 |
| 2020/0387743 A1 | 12/2020 | Wick |

(Continued)

FOREIGN PATENT DOCUMENTS

WO WO9800063 A1 1/1998

OTHER PUBLICATIONS

Whittaker, Michael et al., "Online Template Induction for Machine-Generated Emails", PVLDB, 12(11): 1235-1248, 2019.

(Continued)

*Primary Examiner* — Sibte H Bukhari
(74) *Attorney, Agent, or Firm* — Moffat & Co

(57) ABSTRACT

A computer system, and a method at a computer system, the method including applying a mapping function to a received message to create an characteristic value, wherein the mapping function is adapted to map similar messages to similar characteristic values; comparing the characteristic value to a value associated with each of a plurality of message extractors; determining that the characteristic value does not match any value associated with the plurality of message extractors; identifying at least one message extractor from the plurality of message extractors, the identifying determining that the value associated with the message extractor and the characteristic value from the received message, when compared, satisfy a similarity criterion; and using the identified at least one message extractor to extract information from the received message.

21 Claims, 7 Drawing Sheets

(56) References Cited

U.S. PATENT DOCUMENTS

2021/0360001 A1    11/2021    Proper

OTHER PUBLICATIONS

EP Application No. 22173112.8, Extended European Search Report, dated Oct. 20, 2022, pp. 1-7.
Patent Office Action, U.S. Appl. No. 17/733,782, dated Jun. 21, 2023.
U.S. Appl. No. 18/303,921, "Methods and Systems for the Creation of Parsers Using Large Language Models"; filed Apr. 20, 2023.

* cited by examiner

METHOD AND SYSTEM FOR MESSAGE MAPPING TO HANDLE TEMPLATE CHANGES

FIELD OF THE DISCLOSURE

The present disclosure is related to monitoring of electronic messages, and in particular relates to extracting information from electronic messages created using message templates.

BACKGROUND

Extracted information from messages can be used in a variety of situations. For example, an electronic commerce platform may allow those with accounts on the platform to connect their email accounts. Some or all of the emails arriving at these email accounts can then be monitored by the electronic commerce platform to provide value-added services such as tracking purchases, shipments and deliveries for the account holder.

In order to extract the information, an email extractor may be used. An email extractor is an algorithm which is able to extract relevant pieces of information from the content of an email. For example, the email extractor may extract a Tracking Identifier, Order Date, Ship Date, Carrier, and Products, or other information, related to an order from a buyer's shipping notification email received from a merchant with whom they recently placed an order.

High accuracy and precision email extractors are typically trained to parse only one specific email template each. Therefore, a sophisticated email extracting system, such as one built to interpret e-commerce emails from buyers' inboxes, may require thousands or hundreds of thousands of email extractors, each trained to identify specific relevant information from a single distinct email template.

SUMMARY

In some cases, information from messages generated utilizing a template can be extracted by utilizing a message extractor specialized for such template. However, when a merchant changes the template for messages, a suitable extractor may be difficult to identify. In accordance with the embodiments of the present disclosure, a received message may be assigned a characteristic value. The characteristic value could then be used to compare with a stored value for a variety of message extractors, and based on a similarity index and potentially a quality score, a new message extractor for such message can be created and/or used.

The subject-matter of the present application relates to the identification of a message extractor to be used for obtaining information from a received message.

In one aspect, a method at a computer system is provided. The method includes applying a mapping function to a received message to create a characteristic value, wherein the mapping function is adapted to map similar messages to similar characteristic values. The method further includes comparing the characteristic value to a value associated with each of a plurality of message extractors and determining that the characteristic value does not match any value associated with the plurality of message extractors. The method further includes identifying at least one message extractor from the plurality of message extractors, the identifying determining that the value associated with the message extractor and the characteristic value from the received message, when compared, satisfy a similarity criterion. The method further includes using the identified at least one message extractor to extract information from the received message.

In some embodiments, the method may further include checking information extracted against known information field values to verify the identified at least one message extractor is correctly extracting information.

In some embodiments, the similarity criterion includes a similarity index being within a threshold distance from the characteristic value.

In some embodiments, the received message is an email message and wherein the elements include Hypertext Markup Language (HTML) elements from the email message extracted using XPaths.

In some embodiments, the similarity index is created by correlating elements from the fixed length array with a fixed length array associated with each of the plurality of message extractors.

In some embodiments, the identifying further comprises using information from within the received message to identify at least one message extractor.

In some embodiments, the information comprises at least one of a merchant name, a sender address, a product name, a shipper, or an identifier format in the received message.

In some embodiments, the identifying further uses a volume increase or decrease of messages associated with a characteristic value to identify the at least one message extractor.

In some embodiments, the method further comprises creating a quality score for information extracted from the received message; and extracting information when the quality score exceeds a quality threshold.

In some embodiments, the method further comprises creating a quality score for information extracted from the received message; and referring the message to one of an operator of a commerce platform or a receiving entity to verify information within the received message.

In another aspect, a computer system including a processor and a communications subsystem is provided. The computer system is configured to apply a mapping function to a received message received through the communications subsystem to create a characteristic value, wherein the mapping function is adapted to map similar messages to similar characteristic values. The computer system is further configured to compare the characteristic value to a value associated with each of a plurality of message extractors and determine that the characteristic value does not match any value associated with the plurality of message extractors. The computer system is further configured to identify at least one message extractor from the plurality of message extractors, the identifying determining that the value associated with the message extractor and the characteristic value from the received message, when compared, satisfy a similarity criterion. The computer system is further configured to use the identified at least one message extractor to extract information from the received message.

In some embodiments the computer system is further configured to check information extracted against known information field values to verify the identified at least one message extractor is correctly extracting information.

In some embodiments, the similarity criterion includes a similarity index being within a threshold distance from the characteristic value.

In some embodiments, the received message is an email message and wherein the elements include Hypertext Markup Language (HTML) elements from the email message extracted using XPaths.

In some embodiments, the similarity index is created by correlating elements from the fixed length array with a fixed length array associated with each of the plurality of message extractors.

In some embodiments, the computer system is further configured to identify by using information from within the received message to identify at least one message extractor.

In some embodiments, the information comprises at least one of a merchant name, a sender address, a product name, a shipper, or an identifier format in the received message.

In some embodiments, the computer system is further configured to identify by using a volume increase or decrease of messages associated with a characteristic value to identify the at least one message extractor.

In some embodiments, the computer system is further configured to use the identified at least one message extractor by creating a quality score for information extracted from the received message; and extracting information when the quality score exceeds a quality threshold.

In some embodiments, the computer system is further configured to use the identified at least one message extractor by creating a quality score for information extracted from the received message; and referring the message to one of an operator of a commerce platform or a receiving entity to verify information within the received message.

In a further aspect, a non-transitory computer readable medium for storing instruction code is provided. The instruction code, when executed by a processor of a computer system cause the computer system to apply a mapping function to a received message received through the communications subsystem to create an characteristic value, wherein the mapping function is adapted to map similar messages to similar characteristic values; compare the characteristic value to a value associated with each of a plurality of message extractors; determine that the characteristic value does not match any value associated with the plurality of message extractors; identify at least one message extractor from the plurality of message extractors, the identifying determining that the value associated with the message extractor and the characteristic value from the received message, when compared, satisfy a similarity criterion; and use the identified at least one message extractor to extract information from the received message.

BRIEF DESCRIPTION OF THE DRAWINGS

The present disclosure will be better understood with reference to the drawings, in which.

DETAILED DESCRIPTION

Figure 1:
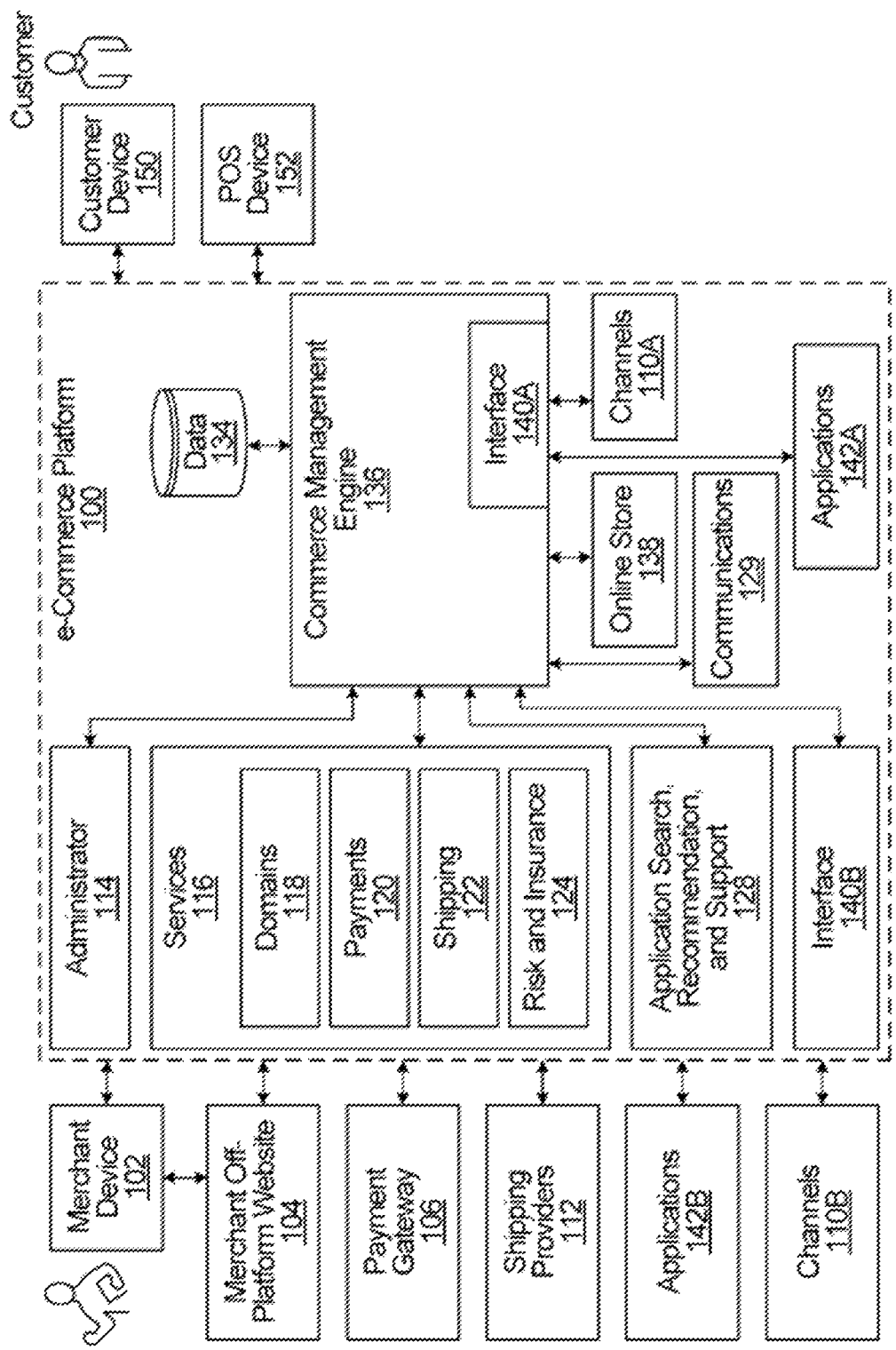
FIG. 1 is a block diagram showing an example e-commerce system capable of implementing the embodiments of the present disclosure.

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

In accordance with various embodiments of the present disclosure, a system can detect that a new template is being used for messages related to the system. The system can then identify possible extractors that can be used to extract information from the messages, if none are already assigned.

In particular, a computer system such as an e-commerce platform, may monitor a user's email box or other messaging system for particular types of messages. Such messages are typically computer generated and form part of the e-commerce transaction, and can include messages that an order has been placed, that an order has been shipped, that the order has been delivered, among other options. Typically, such message is formed utilizing a template. The e-commerce platform may include message extractors for known templates or groups of templates, where the message extractor can successfully extract information from such messages.

When a template changes (e.g., when a particular sender changes the template they are using for sending some or all of their messages), such as if a merchant tweaks or completely changes the layout of an email such as an Order Confirmation email, a new message extractor may need to be used to extract information from a message utilizing such new template. In other cases, the container for the template may completely change, such as a merchant moving from email notification to Short Message Service (SMS) notifications. Further, in some cases the SMS notifications may have their own template.

However, an e-commerce platform serving thousands of vendors may have thousands or hundreds of thousands of message extractors based on known templates and therefore, an appropriate extractor may be hard to identify or may not exist. A consequence of this may be that the system is no longer able to extract content from any of the Order Confirmation emails it receives that use the merchant's new template. Furthermore, it is possible that none of the existing email extractors may be effective at extracting information from the new email template, and therefore a new extractor may be needed. In the meantime, buyers are no longer able to receive updates about this commerce activity.

Systems and methods are provided below for applying a mapping function to a received message to create a characteristic value, also sometimes referred to as a fingerprint, wherein the mapping function is adapted to map similar messages to similar characteristic values. These characteristic values can then be compared to a value associated with each of a plurality of message extractors. When the characteristic value does not match any value associated with the plurality of message extractors, a message extractor may be found for the received message by determining that the value associated with the message extractor and the characteristic value from the received message, when compared, satisfy a similarity criterion. The identified message extractor can then be used to extract information from the received message.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
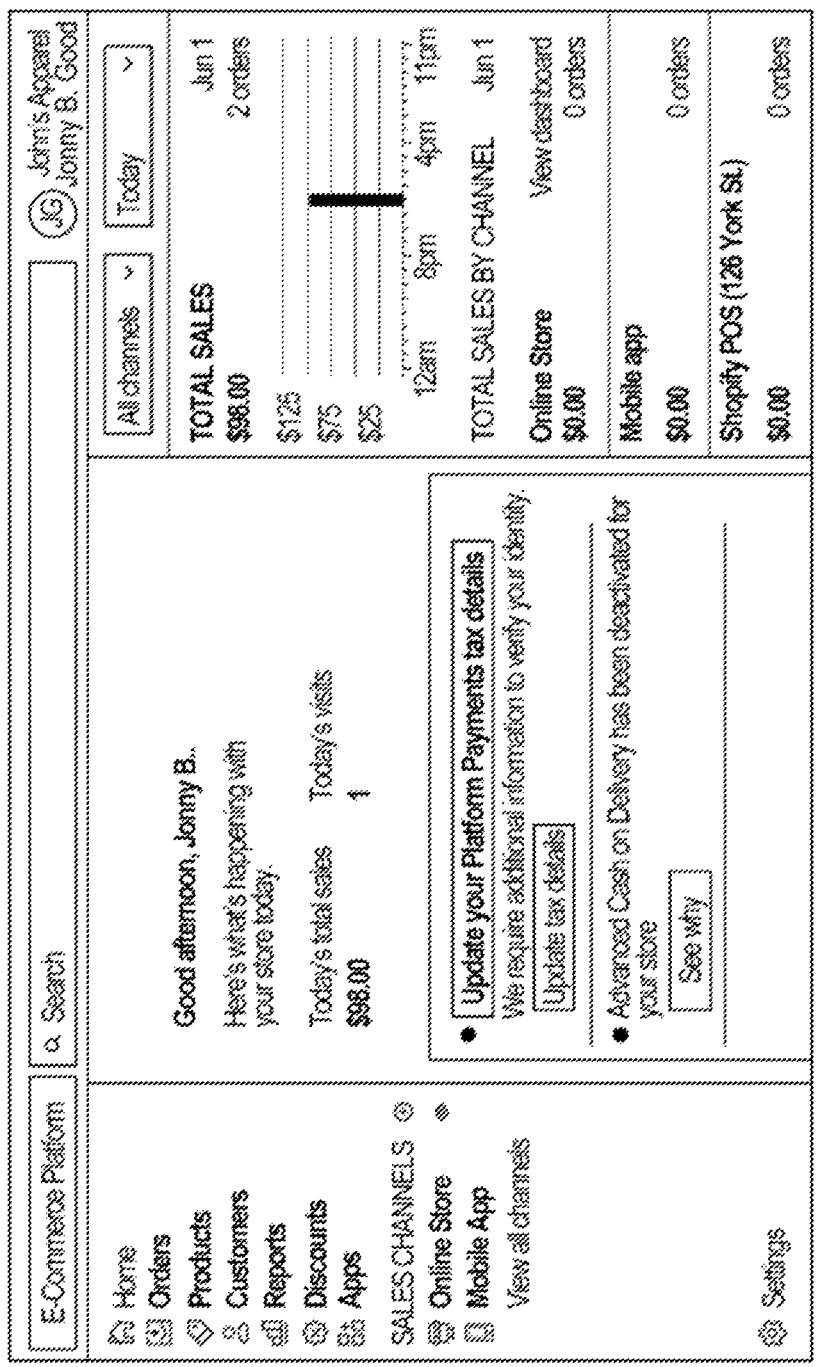
FIG. 2 is a block diagram showing an example interface for a merchant using the e-commerce platform of FIG. 1.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Message Templates

As provided above, an electronic commerce platform such as that described with regards to FIG. 1, may allow those with accounts on the platform to connect their messaging accounts. Messaging accounts may include email accounts, text message accounts, or any other type of account in which a merchant may send messages to a customer. The present disclosure is described with regards to email accounts for illustration. However, this is not limiting, and the same principles could be applied to other types of messaging accounts.

Some or all of the messages arriving at these email accounts can then be monitored by the electronic commerce platform to provide value-added services such as tracking purchases, shipments and deliveries for the account holder.

Typically, such messages will be computer generated using a template. A template is indicative of a structure or layout of a message. For example, reference is made to FIG. 3.

Figure 3:
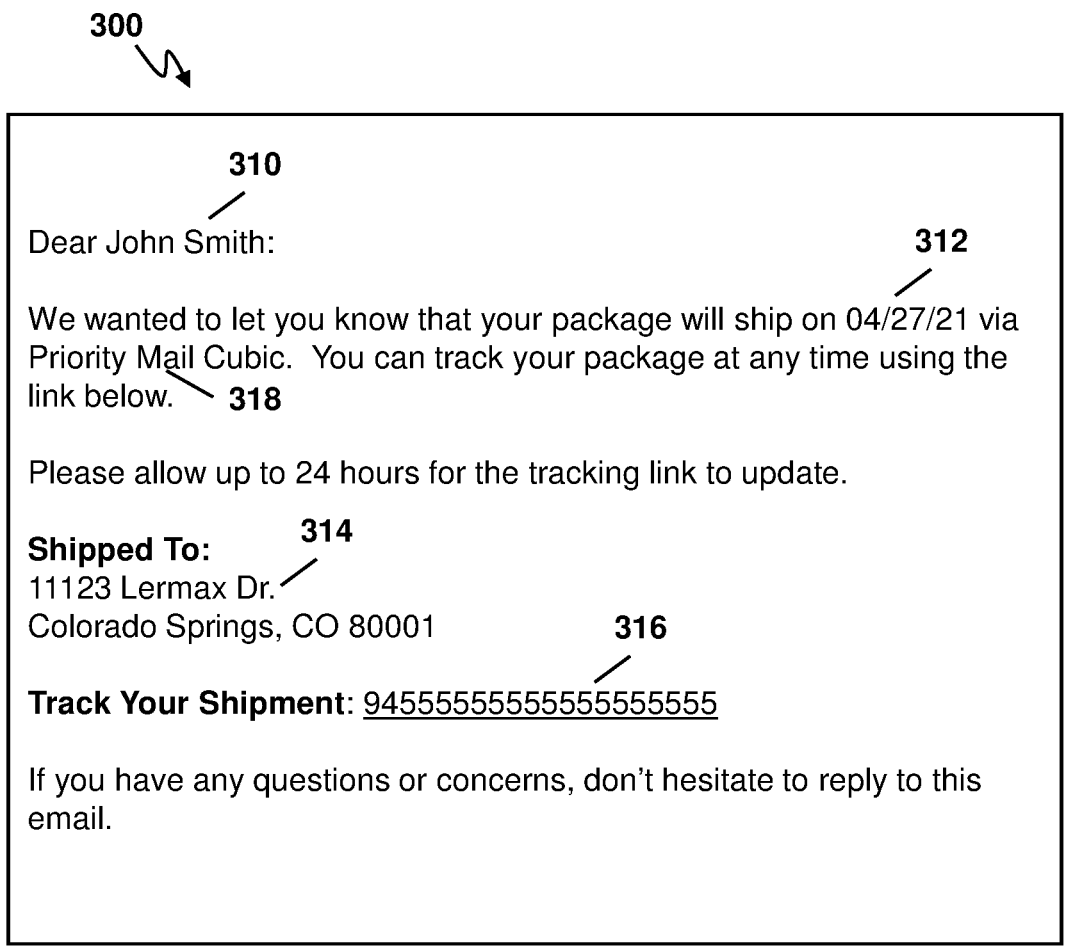
FIG. 3 is a block diagram showing a first example message created from a template with information embedded therein.

In the example of FIG. 3, a message 300 may be received by an account holder of an e-commerce platform. The account holder has subscribed to the e-commerce platform to monitor transactions and in this regard, the message 300 may be analyzed by the e-commerce platform.

Message 300 is from a vendor who uses a first template. In particular, message 300 is a shipping notification to indicate that a product has shipped or will soon ship. Various fields within the message are filled in by the computer generating the message and the remainder of the template remains the same between messages. For example, the template for message 300 includes a name field 310, a shipping date 312, an address shipped to block 314, as well as a URL for the shipping number shown with URL 316 for a shipper 318.

Figure 4:
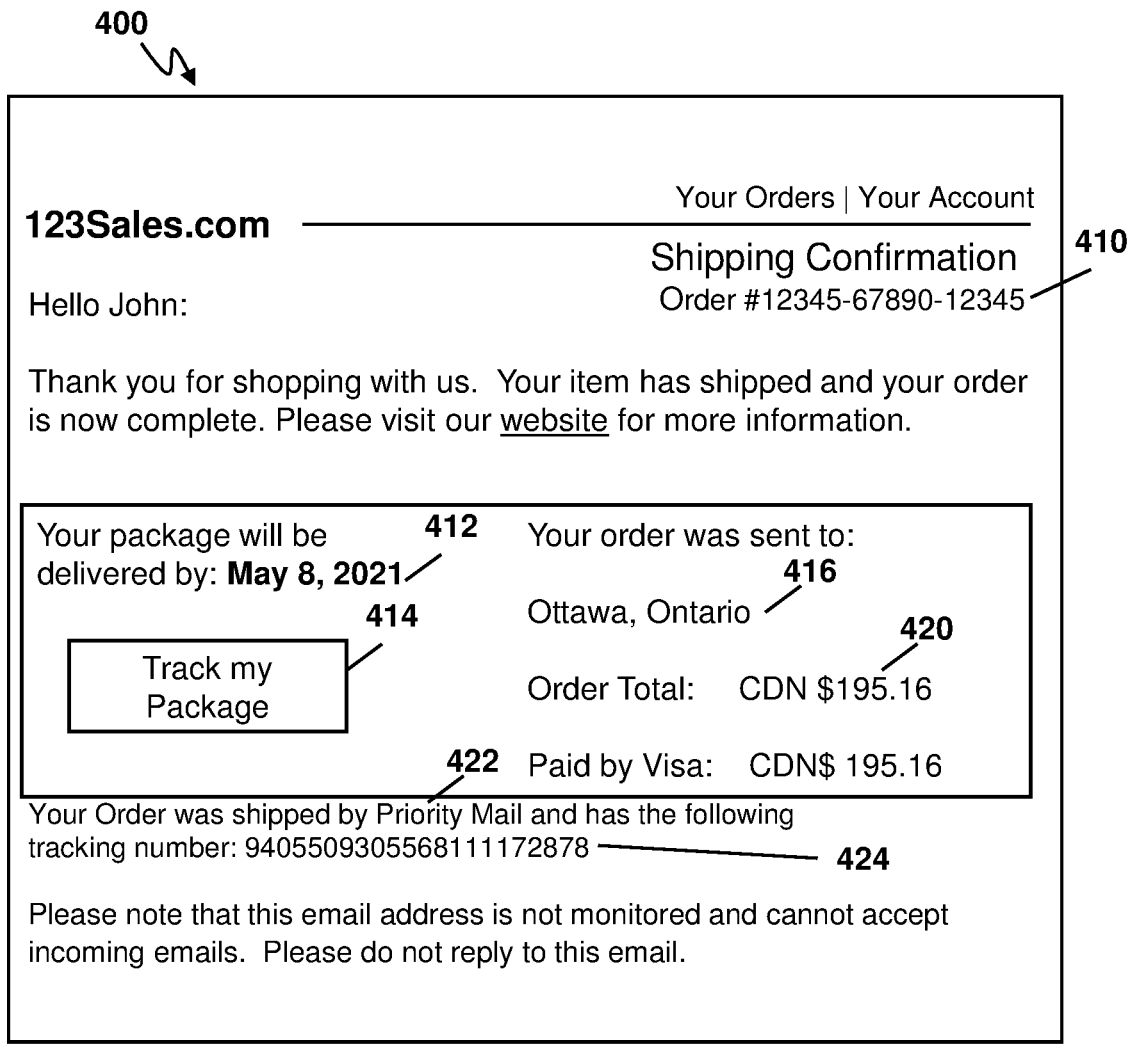
FIG. 4 is a block diagram showing a second example message created from a template with information embedded therein.

Referring to FIG. 4, another example email received by an account holder for the e-commerce platform is provided. In the example of FIG. 4, a message 400 is again a shipping notification indicating that an order has been shipped. Message 400 is from a different vendor and uses a different template than that of FIG. 3, and has various fields such as an order number 410, a delivery date 412, a block or button 414 having a unique URL behind such button, a shipping destination 416, an order price 420, a shipper 422, and a tracking number 424.

When comparing the embodiments of the templates shown in FIGS. 3 and 4, the structure of the templates is completely different. Each email has a unique layout, Hyper-Text Markup Language (HTML) and/or eXtensible Markup Language (XML) structure, and has different XML Paths (XPath). In particular, an XPath is a syntax or language for finding any element in an XML document using the XML path expression.

Further, while the embodiments of FIGS. 3 and 4 show shipping notifications, other messages from a vendor may include an order confirmation message, an order processed notification, a delivery pending shortly notification, a delivery notification, among others. Each may have a different template assigned thereto.

Further, vendors may use different notification templates depending on other factors such as country or region of a customer, a type of product or service involved with a particular transaction, based on the recipient of the message, among other options. For example, if the product is being shipped to a customer in Canada the notification message may be in both English and French, whereas a notification to a customer in the United States may be in English only, or in English and Spanish in some cases. If the customer is a member of a loyalty program the template used may include fields and wording around loyalty rewards for the transaction. Other factors are possible. Each may therefore use a different template.

The structure of a template may be used for assigning templates into groups, called clusters, and assigning a value to such cluster.

Clusters and Cluster Values

In some cases, the same templates may be used by different vendors. For example, when a vendor is part of an e-commerce platform, the e-commerce platform may provide, as part of its service, various templates that the vendor may use for notifications from their storefront. In other cases, related companies may use the same notification templates. Other options for the reuse of templates are also possible.

In this regard, the templates may be assigned into a logical group referred to herein as a cluster. A group of emails utilizing the same template may be grouped or categorized into such cluster, and one or more email extractors as defined below may be assigned to such cluster.

Each cluster may have a value assigned thereto. Specifically, reference is made to FIG. 5, which shows a process for assigning a value to a cluster.

Figure 5:
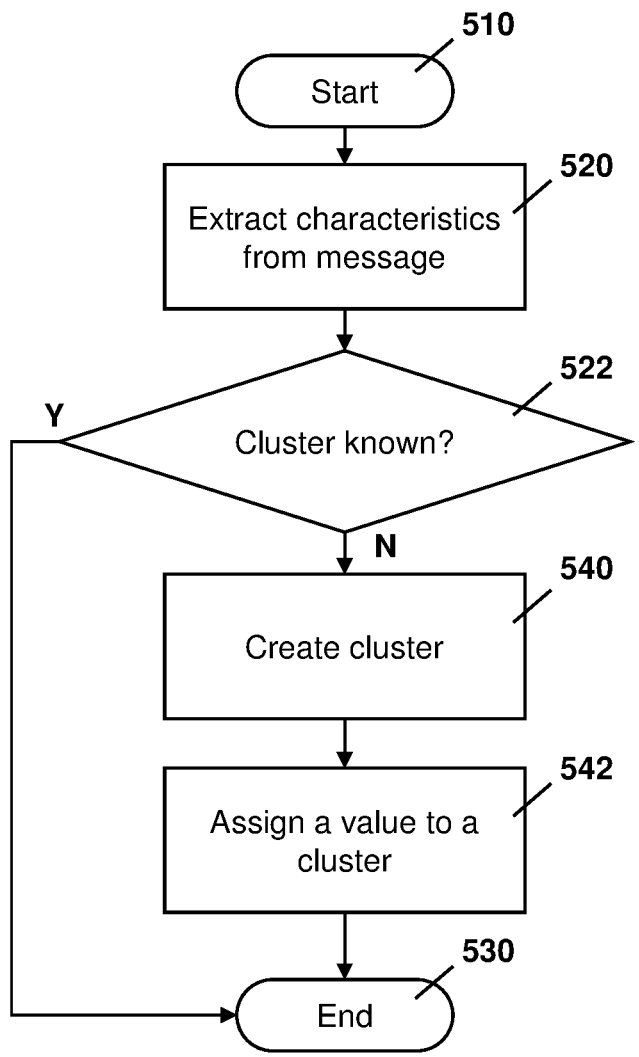
FIG. 5 is a process diagram showing a process for assigning a value to a cluster.

The process of FIG. 5 starts at block 510 and proceeds to block 520 in which characteristics are extracted from a message.

Based on the characteristics extracted at block 520, a check can be made at block 522 to determine whether a cluster is known for the message characteristics. If yes, the process proceeds to block 530 and ends.

Conversely, if a cluster is not known then the process proceeds to block 540 in which a cluster may be created. The process then proceeds to block 542 in which a value is assigned to the cluster. The value may be assigned in various ways.

In one embodiment, the value may be a hash of the elements in a template. For example, utilizing the template for the message of FIG. 3, the XPaths of the email template are:

TABLE 1

Example XPaths for an Email Template

[
'/html',
'/html/body',
'/html/body/font',
'/html/body/font/br[1]',
'/html/body/font/br[2]',
'/html/body/font/br[3]',
'/html/body/font/br[4]',
'/html/body/font/br[5]',
'/html/body/font/br[6]',
'/html/body/font/b[1]',
'/html/body/font/br[7]',
'/html/body/font/br[8]',
'/html/body/font/br[9]',
'/html/body/font/br[10]',
'/html/body/font/b[2]',
'/html/body/font/a',
'/html/body/font/br[11]',
'/html/body/font/br[12]'
]

In one embodiment, the value for the cluster may therefore be based on a minhash of the XPaths for the primary email template used for that cluster. A minhash is an algorithm for estimating how similar two sets are and may in some cases produce a fixed length array of values for a given input. For example, the XPaths in Table 1 can be used in a minhash function where the output is defined to have a fixed sized array of values, for example 128 values. This is however not limiting and other lengths are possible. The output of such minhash function may be:

TABLE 2

Example minhash of XPaths of Table 1

[4138275, 58467968, 361694150, 60789464, 245961614, 7841238, 90464114, 57044459, 354535158, 194189851, 140056852, 60798928, 194284999, 45838352, 151698913, 36481736, 27197609, 332341639, 70279226, 349082816, 185879925, 186146414, 89945648, 276059490, 38312470, 133999309, 23856165, 277015002, 572091941, 92895461, 80811224, 214262812, 545873223, 9395008, 10930505, 227986709, 20629749, 31596960, 466741011, 51216863, 551949416, 295030646, 677315696, 42131191, 107637808, 63825010, 246814026, 49316811, 325148032, 213424747, 249791222, 29511745, 69035818, 28622995, 512800234, 139457788, 313654355, 36857204, 55603873, 275578986, 363485812, 153524886, 123565663, 61487864, 13420203, 28292728, 14478851, 64900169, 7373373, 425451853, 294656222, 6716086, 320325391, 495924302, 407123249, 363237260, 189620341, 243627538, 133233712, 165993244, 543186247, 189101443, 366586677, 242145588, 53910115, 220089639, 47608692, 279398352, 465508506, 120219978, 606245647, 448302536, 250528084, 920785849, 156799164, 131690695, 381496397, 181417001, 137386063, 223089022, 616125108, 278446605, 797038136, 163450663, 72773915, 460478840, 34887879, 15320297, 2666089, 21835911, 9738635, 82448666, 421678353, 129315830, 24403591, 900464338, 103312975, 159061420, 198902214, 144899528, 77265193, 221203133, 2817520, 74641430, 144255143, 102180984, 73413794, 137281749]

The array of Table 2 may therefore be the value assigned at block 542 to the cluster containing the template for the email message of FIG. 3.

The use of a minhash to calculate the value at block 542 is however merely an example. In other cases, values could be generated using other techniques. For example, an encoder using a natural language processing machine learning (ML) model could be used. Such encoder may be trained on millions of raw emails to gain its own understandings of emails and structures. Such encoder could assign a value to the cluster, and subsequently a cosine similarity could be used to match a value for an incoming email to a centroid.

In other cases, other value assigning processes could be used.

Once the value is assigned at block 542 the process proceeds to block 530 and ends.

The process of FIG. 5 could, for example, be used whenever a new cluster is created. If a value needs to be assigned to more than one cluster in a system, the process of FIG. 5 could be repeated for each cluster.

Message Extractor

A message extractor is an algorithm, code segment or program that is used to find information from a message. The message extractor may be customized or programmed specifically for a template to allow the program to quickly and accurately find the information elements desired by a computer system such as an e-commerce platform.

The information elements extracted by an email extractor could be configured based on the type of message being received and the type of information within that message. Further, certain information may be relevant for the e-commerce platform or computer system while other information may be irrelevant, and therefore the message extractor may be customized to obtain only the relevant information in some cases.

Utilizing the example message from FIG. 3, one simplified message extractor is illustrated with regard to Table 3.

TABLE 3

Example of a simplified message extractor

{
  "tracking_number": "xpath[/html/body/font/a/text( )]",
  "carrier": null,
  "tracking_url": "xpath[/html/body/font/a/@href]"
}

As seen in the example of Table 3, the information sought from the message of FIG. 3 by a computer system such as an e-commerce platform includes the tracking number, and tracking URL. The location of these elements is provided as an XPath within the message. However, this is merely an example and the identification of the information desired within a message template could be done in other ways, such as relative positions, based on tags within the message, among other options.

Further, in the example of Table 3, information about a carrier may also be desired by an e-commerce platform. However, in this case the message does not include such information and therefore the value is assigned as a null value in accordance with the example of Table 3. In other cases, information that is not available may simply be ignored by the message extractor. Other options are possible.

Based on the simplified message extractor of Table 3, the information extracted from the message of FIG. 3 is provided in Table 4 below.

TABLE 4

Information from the message extractor of Table 3

{
"carrier": null,
"tracking_number": "94555555555555555555 ",
"tracking _url":
"https://tools.usps.com/go/TrackConfirmAction.action?tLabels=
94555555555555555555 "
}

While the example extractor of Table 3 and results of Table 4 provide for the tracking number and tracking URL. In other examples the computer system or e-commerce platform may desire to check a shipping address against a registered shipping address for a client and therefore may extract the shipping address 314 from message 300. In other cases, the date 312 may be extracted. In some cases, more sophisticated algorithms may be applied to the data and more or fewer data fields may need to be extracted. Therefore, the example of Table 3 is provided merely for illustration purposes.

As seen from the example of Table 3, the message extractor is a program that can be run quickly on messages as they are received at the system and the message extractor is tailored to the template by utilizing the positions of the information within the message for extraction. This ensures that computing resources are utilized efficiently when processing thousands or hundreds of thousands of messages in a short time period.

For this reason, high accuracy and precision email extractors are typically trained to parse only one specific email template each. Therefore, a sophisticated email extracting system, such as one built to interpret e-commerce emails from buyers' inboxes, may require thousands or hundreds of thousands of email extractors, each trained to identify specific relevant information from a single distinct email template.

When an email template changes, such as if a merchant tweaks or completely changes the layout of an email such as an Order Confirmation email, an appropriate extractor may be hard to identify or may not exist. The consequence of this is that the system is no longer able to extract content from any of the Order Confirmation emails it receives that use the merchant's new template. Furthermore, it is possible that none of the existing email extractors may even be effective at extracting information from the new email template, therefore a new extractor may be needed.

However, because thousands or hundreds of thousands of extractors may exist, it is not computationally efficient to try each one against the new template. Therefore, techniques are provided herein to programmatically and efficiently identify or generate an extractor when a new template is identified.

Finding Matching Extractor

Various techniques exist to identify that a new message template has been introduced into a computer system. In a first embodiment, the identification may be done on a message-by-message basis, where a received message is assigned a value and the value is compared to cluster values to find a message extractor.

In another embodiment, a volume of messages for a particular cluster can be compared with historical volumes and if a significant decrease for a particular cluster is noticed, this may be indicative that the merchant(s) associated with the cluster may have changed their template. This embodiment may take into account factors such as the day of the week, day of the year, significant shopping days, among other such information when determining whether a significant drop has been experienced. In these embodiments, a significant drop may be a drop that is greater than a threshold percentage, for example.

In one embodiment, rather than a drop in traffic, a drop in the amount of information provided for a cluster may be detected. For example, if a cluster is providing less information, this can be an indicator that the information is being communicated elsewhere.

Therefore, in accordance with this embodiment, a system which can detect a flip in email volume into a new cluster or decrease in information from a cluster, and identify possible extractors that can be used to extract information from the new emails, if none are already assigned, is provided.

Each is described below.

Figure 6:
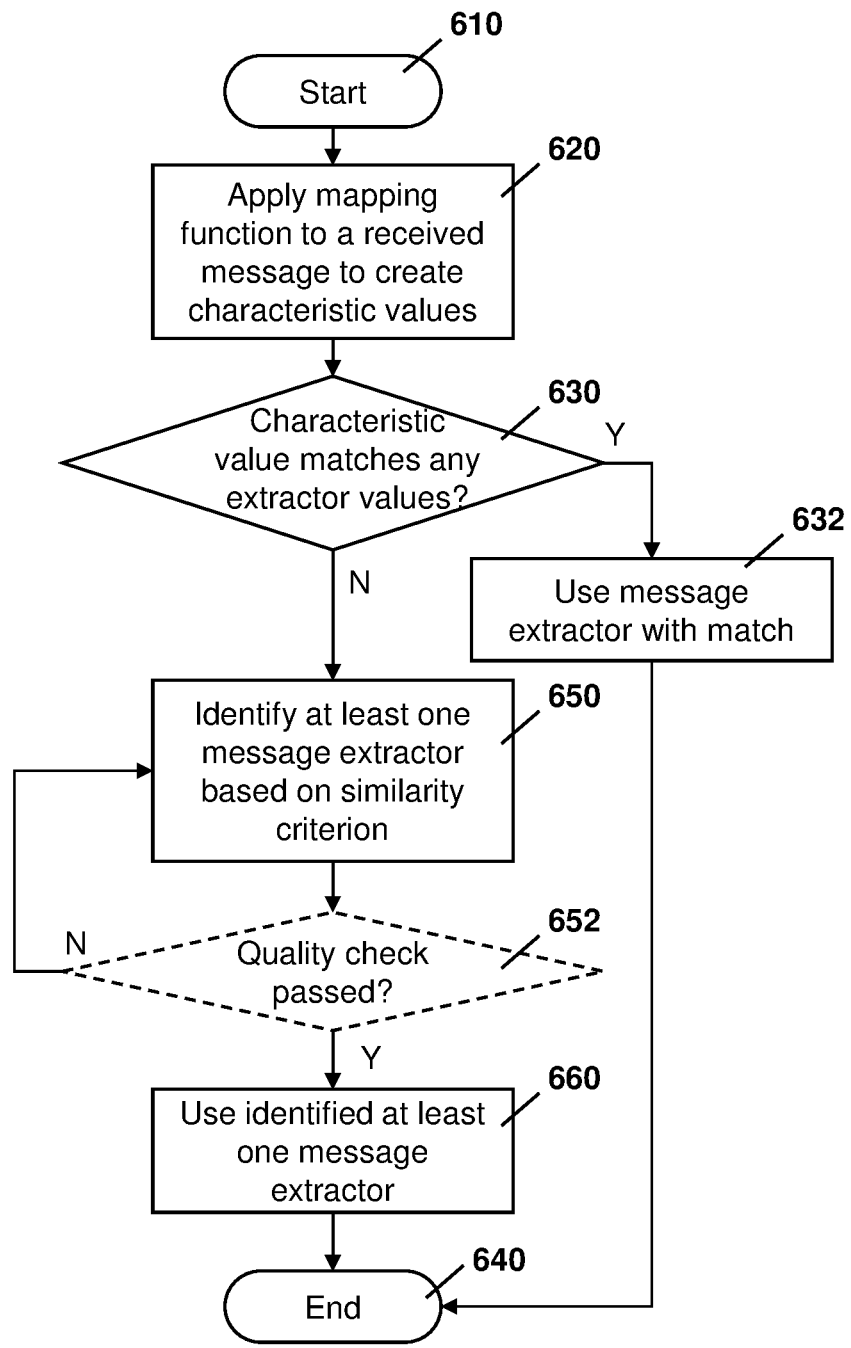
FIG. 6 is a process diagram for identification of at least one message extractor for use in extracting information from a received message.

In particular, reference is now made to FIG. 6. In the embodiment of FIG. 6, the process starts at block 610 and proceeds to block 620 in which a mapping function may be applied to a received message to create characteristic values for such message. For example, the mapping function may be the XPath minhash function described above with regard to Table 2. In other cases, the mapping function may be a natural language processing algorithms applied to a message. In other cases, other types of mapping functions could also be used.

The mapping function creates a characteristic value which can then be used to identify a cluster and corresponding message extractor or extractors. In particular, from block 620 the process proceeds to block 630 to check whether the characteristic value matches any extractor values. This may be done, for example, by checking the array of values of the minhash for the message with arrays of values for the clusters and the extractors associated therewith. The comparison may not need an exact match, but in some cases the match may need to be close enough according to a specified threshold.

For example, utilizing the minhash example above, the minhash will produce 128 values in an array. Therefore, if the characteristic value for the message is an array of 128 values and the value associated with a cluster is an array of 128 values, each value can be compared against the value in the corresponding position in the other array. If a threshold number of values matches, this may indicate that the characteristic value matches the extractor values.

Similarly, natural language processing may create a value which can then be compared on a cosine similarity basis to the value for each of the extractors to find if a match exists. The match may exist, in this case, if the characteristic value, when the cosine similarity function is applied, is above a threshold.

Other techniques for determining whether the characteristic value matches a value for an extractor at block 630 are also possible.

From block 630, if a match exists, then the process proceeds to block 632 in which the message extractor(s) found at block 630 are used to extract the desired information from the message. The process then proceeds to block 640 and ends.

Rather than the processes at blocks 620 and 630, in some cases use of the clusters may be monitored to determine whether a drop in the number of messages being placed into a cluster or information from the messages is detected. For example, this may occur when a retailer changes a notification template. The messages destined for the original cluster when using the original template will experience a drop while a new cluster will experience a proportionate rise in messages. The new cluster may or may not exist within the system. Therefore, in one embodiment (not shown) a computer system may monitor the volume of messages being processed by each cluster and make note of any drops in expected numbers of messages in any particular cluster. The computer system may further monitor any rise or creation of a new cluster. A drop in messages in one cluster and a creation or rise in another cluster may be indicative of a template changing. In this case, the computer system may perform a check to determine whether the new cluster is already in the system and has an extractor that can be used for the received messages. If yes, the process will proceed to block 632 in which the known message extractor can be used to extract relevant information from the received message.

As will be appreciated by those in the art, the rise or drop in the number of messages seen in a cluster can be affected by outside factors which may be taken into account by the computer system. For example, the cluster may experience a significant rise on certain days of the year, such as Black Friday or Cyber Monday. Certain days of the week may historically have a higher or lower message volume and such historic values could also be used by the computer system to determine whether a drop in volume has been experienced. Other factors could also be taken into account when the determination of whether a volume of messages for a cluster has changed.

Referring again to FIG. 6, if it is determined that the characteristic value does not match any extractor values, either based on the individual message or the cluster, the process proceeds from block 630 to block 650 in which at least one message extractor may be identified based on a similarity criterion.

Specifically, as no message extractors have currently been assigned to the received message or new cluster, the system needs to either identify an existing extractor which will work or to create a new message extractor. However, computationally it would be a very long process to run all of the message extractors in a system against the received message to determine whether the information needed was successfully extracted. Given the volume of messages received at a typical e-commerce platform, such processing could result in significant delays, dropped messages, or an expenditure of significant resources to provide for the processing power needed, among other difficulties. Rather, the present disclosure provides for a more focused search for message extractors.

Specifically, in accordance with the embodiments of the present disclosure, the characteristic value obtained for the received message can be compared with the values associated with existing message extractors to identify a subset of message extractors that could be attempted to be used.

In one embodiment, the message extractors could be identified by finding message extractors which exceed a similarity index. Using the minhash example again, a comparison between the array for the characteristic values and the array for a plurality of message extractors could be made. If the number of matches between the two arrays exceeds a similarity index, such message extractor could be attempted.

In other cases, a cosine similarity value could be used.

In other cases, Jaccard similarity could be used. Other similarity comparisons could also be made.

The identification at block 650 could identify one or more message extractors. For example, if the similarity index is matched by a plurality of message extractors, in some cases each of the message extractors above the similarity index could be tried. In other cases, if the number of message extractors above the similarity index is too high, then a subset of the identified message extractors could be attempted.

Further, secondary factors may also be used to help identify the message extractor. For example, if a sudden increase in the volume of one cluster is noticed (which may correspond with a decrease in another cluster), this may indicate that a template for emails from the decreased cluster may have been changed, and the extractor for the decreased cluster may be added to the one or more extractors identified.

In other cases, evidence such as a name of a merchant, subject line, sender email address, product names, lengths and numbers of shipping identifiers, among others, could be used to add to the one or more extractors identified.

In some cases, generic or catch-all extractors, and or automated extractors, could be added to the one or more extractors identified as well.

Once the one or more extractors has been identified, they can be used to extract information from the message as shown at block 660. For example, a cluster with the highest similarity index may in some cases be bound to the received message or cluster for the received message. This binding may be temporary in some cases, until a better message extractor is found, for example.

The extracted information may also optionally be given a "quality score" based on various factors. For example, if X values are expected to be extracted, but only X-Y values are found using the extractor, this can lower the quality index. Each expected field may be given a weight in some cases, and the quality score may be affected by the weight of the missing fields.

Extrinsic evidence, such as known formats for data from a particular merchant, can also be used in finding the quality score.

In some cases, a comparison between the values obtained from a plurality of extractors can also be used.

If the quality score from one extractor in some cases, or from values from a plurality of extractors in other cases, exceeds a threshold, a new extractor may be assigned for the message identifier, and the new extractor can immediately begin parsing such messages.

In some cases the new extractor may be a combination of two or more previous extractors, or parts thereof, to find the expected values fields. Thus, a new message extractor may be created based on a plurality of previously known message extractors, where parts of such previously known message extractors producing desired data may be combined.

In some cases, the new extractor may be created based on a modification of existing extractors and further based on information regarding the calculated difference between the original extractor template and new template. Specifically, information about the differences between the old and new templates may be used to modify the extractors. For example, the root of the XPaths can be changed to the updated structure and the new extractor can then be tried on the new template. Other examples are possible.

This optional quality check is shown as block 652 in the embodiment of FIG. 6, where the use of the identified at least one message extractor at block 660 is only performed if the quality check exceeds a threshold. If not, more message extractors can be identified at block 650.

Further, in some cases the quality can be increased by using other sources of information, such as an operator for the merchant platform identifying information elements, or crowdsourcing to verify information elements. For example, when a new cluster is identified, a request to an operator at the e-commerce platform may be made to verify that the extractor is working correctly. In other cases, the recipient of the original message may be queried to determine whether information identified is correct within the message. In other cases, crowd sourcing through a blog or quality control website may be done requesting verification. Other options are possible. This could therefore be used to create a new message extractor based on previous message extractors.

The urgency of the request to the other sources of information may be correlated to the volume of email messages having the same identifier within the computer system in some cases.

The above-discussed methods are computer-implemented methods and require a computer for their implementation/use. Such computer system could be implemented on any type of, or combination of, network elements or computing devices. For example, one simplified computing device that may perform all or parts the embodiments described herein is provided with regard to FIG. 7.

Figure 7:
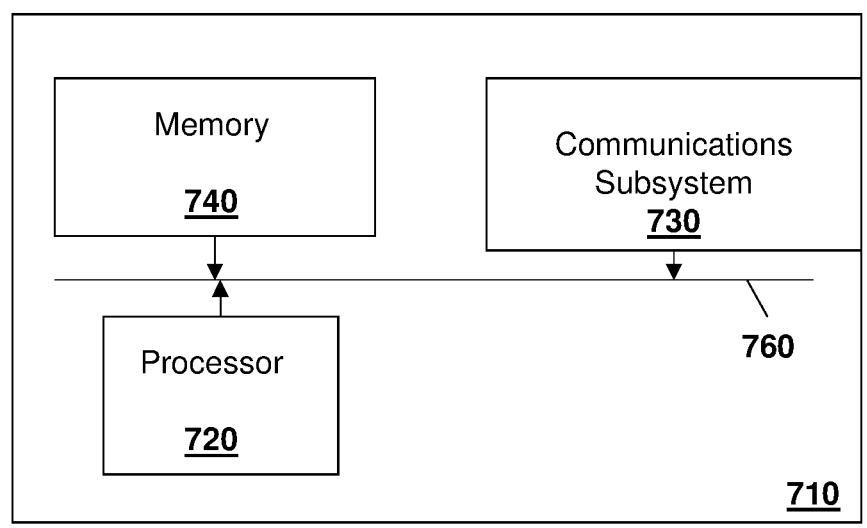
FIG. 7 is a block diagram of a simplified computer device capable of being used with embodiments of the present disclosure.

In FIG. 7, computing device 710 includes a processor 720 and a communications subsystem 730, where the processor 720 and communications subsystem 730 cooperate to perform the methods of the embodiments described herein.

The processor 720 is configured to execute programmable logic, which may be stored, along with data, on the computing device 710, and is shown in the example of FIG. 7 as memory 740. The memory 740 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 720 may also be implemented entirely in hardware and not require any stored program to execute logic functions. Memory 740 can store instruction code, which, when executed by processor 720 cause the computing device 710 to perform the embodiments of the present disclosure.

Alternatively, or in addition to the memory 740, the computing device 710 may access data or programmable logic from an external storage medium, for example through the communications subsystem 730.

The communications subsystem 730 allows the computing device 710 to communicate with other devices or network elements. In some embodiments, communications subsystem 730 includes receivers or transceivers, including, but not limited to, ethernet, fiber, Universal Serial Bus (USB), cellular radio transceiver, a Wi-Fi transceiver, a Bluetooth transceiver, a Bluetooth low energy transceiver, a GPS receiver, a satellite transceiver, an IrDA transceiver, among others. As will be appreciated by those in the art, the design of the communications subsystem 730 will depend on the type of communications that the transaction device is expected to participate in.

Communications between the various elements of the computing device 710 may be through an internal bus 760 in one embodiment. However, other forms of communication are possible.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A method at a computer system, the method comprising:
applying a mapping function to a received message to create a characteristic value, wherein the mapping function is adapted to map similar messages to similar characteristic values;
comparing the characteristic value to a value associated with each of a plurality of message extractors;
determining that the characteristic value does not match any value associated with the plurality of message extractors;
identifying at least one message extractor from the plurality of message extractors, the identifying determining that the value associated with the message extractor and the characteristic value from the received message, when compared, satisfy a similarity criterion, wherein the similarity criterion includes a similarity index being within a threshold distance from the characteristic value; and
using the identified at least one message extractor to extract information from the received message.

2. The method of claim 1, further comprising checking information extracted against known information field values to verify the identified at least one message extractor is correctly extracting information.

3. The method of claim 1, wherein the received message is an email message and wherein the elements include Hypertext Markup Language (HTML) elements from the email message extracted using XPaths.

4. The method of claim 1, wherein the characteristic value comprises a fixed length array, and the similarity index is created by correlating elements from the fixed length array with a fixed length array associated with each of the plurality of message extractors.

5. The method of claim 1, wherein the identifying further comprises using information from within the received message to identify at least one message extractor.

6. The method of claim 5, wherein the information comprises at least one of a merchant name, a sender address, a product name, a shipper, or an identifier format in the received message.

7. The method of claim 1, wherein the identifying further uses a volume increase or decrease of messages associated with a characteristic value to identify the at least one message extractor.

8. The method of claim 1, wherein the using further comprises:
creating a quality score for information extracted from the received message; and
extracting information when the quality score exceeds a quality threshold.

9. The method of claim 1, wherein the using further comprises:
creating a quality score for information extracted from the received message; and
referring the message to one of an operator of a commerce platform or a receiving entity to verify information within the received message.

10. A computer system comprising:
a processor; and
a communications subsystem,
wherein the computer system is configured to:
apply a mapping function to a received message received through the communications subsystem to create a characteristic value, wherein the mapping function is adapted to map similar messages to similar characteristic values;
compare the characteristic value to a value associated with each of a plurality of message extractors;
determine that the characteristic value does not match any value associated with the plurality of message extractors;
identify at least one message extractor from the plurality of message extractors, the identifying determining that the value associated with the message extractor and the characteristic value from the received message, when compared, satisfy a similarity criterion, wherein the similarity criterion includes a similarity index being within a threshold distance from the characteristic value; and
use the identified at least one message extractor to extract information from the received message.

11. The computer system of claim 10, wherein the computer system is further configured to check information extracted against known information field values to verify the identified at least one message extractor is correctly extracting information.

12. The computer system of claim 10, wherein the received message is an email message and wherein the elements include Hypertext Markup Language (HTML) elements from the email message extracted using XPaths.

13. The computer system of claim 10, wherein the characteristic value comprises a fixed length array, and the similarity index is created by correlating elements from the fixed length array with a fixed length array associated with each of the plurality of message extractors.

14. The computer system of claim 10, wherein the computer system is further configured to identify by using information from within the received message to identify at least one message extractor.

15. The computer system of claim 14, wherein the information comprises at least one of a merchant name, a sender address, a product name, a shipper, or an identifier format in the received message.

16. The computer system of claim 10, wherein the computer system is further configured to identify by using a volume increase or decrease of messages associated with a characteristic value to identify the at least one message extractor.

17. The computer system of claim 10, wherein the computer system is further configured to use the identified at least one message extractor by:
creating a quality score for information extracted from the received message; and
extracting information when the quality score exceeds a quality threshold.

18. The computer system of claim 10, wherein the computer system is further configured to use the identified at least one message extractor by:
creating a quality score for information extracted from the received message; and
referring the message to one of an operator of a commerce platform or a receiving entity to verify information within the received message.

19. A non-transitory computer readable medium for storing instruction code, which, when executed by a processor of a computer system cause the computer system to:
apply a mapping function to a received message received through the communications subsystem to create a characteristic value, wherein the mapping function is adapted to map similar messages to similar characteristic values;
compare the characteristic value to a value associated with each of a plurality of message extractors;
determine that the characteristic value does not match any value associated with the plurality of message extractors;
identify at least one message extractor from the plurality of message extractors, the identifying determining that the value associated with the message extractor and the characteristic value from the received message, when compared, satisfy a similarity criterion, wherein the similarity criterion includes a similarity index being within a threshold distance from the characteristic value; and
use the identified at least one message extractor to extract information from the received message.

20. The non-transitory computer readable medium of claim 19, wherein the instruction code further cause the computer system to:
check information extracted against known information field values to verify the identified at least one message extractor is correctly extracting information.

21. The non-transitory computer readable medium of claim 19, wherein the received message is an email message and wherein the elements include Hypertext Markup Language (HTML) elements from the email message extracted using Xpaths.

* * * * *

UNITED STATES PATENT AND TRADEMARK OFFICE
CERTIFICATE OF CORRECTION

PATENT NO. : 11,810,052 B2
APPLICATION NO. : 17/390162
DATED : November 7, 2023
INVENTOR(S) : Dexter Fichuk, Vera Olsson and Anton Vlasenko Page 1 of 1

It is certified that error appears in the above-identified patent and that said Letters Patent is hereby corrected as shown below:

In the Claims

Column 24, Line 60, Claim 3, please delete "the elements" and insert -- elements of the received message --, therefor.

Column 25, Lines 56-57, Claim 12, please delete "the elements" and insert -- elements of the received message --, therefor.

Column 26, Line 33, Claim 19, please delete "the communications" and insert -- a communications --, therefor.

Column 26, Line 60, Claim 21, please delete "the elements" and insert -- elements of the received message --, therefor.

Signed and Sealed this
Ninth Day of April, 2024

Katherine Kelly Vidal
*Director of the United States Patent and Trademark Office*